(12) United States Patent
Jain et al.

(10) Patent No.: US 9,122,049 B2
(45) Date of Patent: Sep. 1, 2015

(54) OPTICAL COMPENSATION IN SURVEILLANCE DOMES

(75) Inventors: Prateek Jain, Fort Collins, CO (US); David Campbell, Loveland, CO (US)

(73) Assignee: Pelco, Inc., Clovis, CA (US)

( * ) Notice: Subject to any disclaimer, the term of this patent is extended or adjusted under 35 U.S.C. 154(b) by 441 days.

(21) Appl. No.: 12/981,659

(22) Filed: Dec. 30, 2010

(65) Prior Publication Data

US 2012/0169870 A1    Jul. 5, 2012

(51) Int. Cl.
     *H04N 7/18*    (2006.01)
     *G02B 27/00*    (2006.01)
     *G02B 27/42*    (2006.01)

(52) U.S. Cl.
     CPC ........ *G02B 27/0025* (2013.01); *G02B 27/0037* (2013.01); *G02B 27/4216* (2013.01)

(58) Field of Classification Search
None
See application file for complete search history.

(56) References Cited

U.S. PATENT DOCUMENTS

| | | | |
|---|---|---|---|
| 4,705,343 A | 11/1987 | Simons | |
| 4,864,137 A | 9/1989 | Klein | |
| 5,852,754 A * | 12/1998 | Schneider | 396/427 |
| 5,946,143 A | 8/1999 | Whalen | |
| 6,028,712 A * | 2/2000 | McKenney et al. | 359/642 |
| 7,576,310 B2 | 8/2009 | Konno et al. | |
| 8,334,490 B2 * | 12/2012 | Schaub et al. | 250/203.6 |
| 2005/0093992 A1 * | 5/2005 | Fukumoto | 348/222.1 |
| 2005/0259985 A1 | 11/2005 | Mulvey et al. | |
| 2011/0141260 A1 * | 6/2011 | Ouchi et al. | 348/79 |

FOREIGN PATENT DOCUMENTS

WO      99/18455 A1    4/1999

OTHER PUBLICATIONS

International Search Report and Written Opinion for PCT/US2011/067746, mailed Aug. 7, 2012.
Supplementary European Search Report dated Apr. 15, 2014 for European Application No. EP11853652, 6 pages.
EPO Examination Report for Application No. EP11853652.3, dated Dec. 17, 2014, 4 pgs.
International Preliminary Report on Patentability for International Application No. PCT/US2011/067746, dated Jul. 11, 2013, 6 pgs.

* cited by examiner

*Primary Examiner* — Frederick Bailey
(74) *Attorney, Agent, or Firm* — Hunter Clark PLLC (57) ABSTRACT

Techniques are discussed for correcting optical aberrations that exist in surveillance domes that have spherical and non-spherical parts. For example, the image quality of a surveillance camera is reduced when it focuses on an object through a non-spherical base of a surveillance dome. This image quality reduction could potentially compromise the security of the area monitored by the surveillance camera by failing to provide enough detail to identify individuals or other objects of interest. Utilizing a corrective optical element to provide curvature to a wavefront that travels through the non-spherical base, however, helps preserve the image quality of the camera and thereby helps maintain the integrity of the surveillance system.

20 Claims, 7 Drawing Sheets

OPTICAL COMPENSATION IN SURVEILLANCE DOMES

BACKGROUND

Surveillance systems are often used to monitor activity of a secure area. For instance, video cameras and other devices can provide visual, audio, movement, heat and other information that can allow a security guard to determine whether a secure area is being breached. Video cameras are often located behind transparent or semi-transparent surveillance domes to hide the camera's orientation, thereby making it more difficult for an observer to determine whether his or her actions may be caught on camera.

Modern video cameras offer high-power zooming capabilities that enable the cameras to focus on distant objects. The farther away objects are from a camera, the more horizontal the camera's orientation needs to be to keep the objects in the camera's viewing area. For cameras located behind surveillance domes, issues can arise when the cameras are oriented in a near-horizontal position. These issues include having a limited viewing area and/or reduced image quality due to optical aberrations introduced by surveillance domes.

SUMMARY

An example of an optical system for correcting optical aberrations according to the disclosure includes a dome with a spherical portion and a non-spherical portion. The non-spherical portion is coupled to the spherical portion and the non-spherical portion has circular curvature along a first axis. The optical system further includes an optical element configured to provide circular curvature to an optical wavefront that travels through the non-spherical portion.

Implementations of such an optical system may include one or more of the following features. The optical element is configured to provide circular curvature to the optical wavefront along a second axis orthogonal to the first axis. The optical element comprises a cylindrical lens having curvature along the second axis. The curvature of the cylindrical lens along the second axis is substantially the circular curvature of the non-spherical portion along the first axis. The optical element comprises a diffractive optical element. The optical element comprises an adaptive optics element. The non-spherical portion is cylindrical or frustoconical.

An example of a surveillance system according to the disclosure includes, a dome with a spherical portion and a non-spherical portion. The non-spherical portion is coupled to the spherical portion, the non-spherical portion having circular curvature along a first axis. The surveillance system also includes a camera, disposed within the dome, rotationally mounted to provide rotational movement around a point coincident with a center of curvature of the spherical portion. Finally, the surveillance system has an optical element configured to provide circular curvature to an optical wavefront that travels through the non-spherical portion toward the camera.

Implementations of such a surveillance system may include one or more of the following features. The non-spherical portion is configured to provide circular curvature to the optical wavefront along a second axis orthogonal to the first axis. A mount coupled to the optical element and configured to remove the optical element from a position adjacent to the non-spherical portion. The optical element is affixed to the non-spherical portion. The optical element comprises a cylindrical lens having curvature along a second axis orthogonal to the first axis. The curvature of the cylindrical lens along the second axis is substantially the circular curvature of the non-spherical portion along the first axis. The optical element comprises a diffractive optical element. The optical element comprises an adaptive optics element. The non-spherical portion is cylindrical or frustoconical.

An example of another surveillance system according to the disclosure includes, a dome of a non-opaque material and including a hemispherical portion having circular curvature along a first axis and a second axis. The second axis is orthogonal to the first axis. The dome also includes a non-spherical portion coupled to the hemispherical portion, the non-spherical portion having circular curvature along the first axis. The surveillance system further has a camera, disposed within the dome, rotationally mounted to provide rotational movement around a point coincident with a center of curvature of the hemispherical portion. Finally, the surveillance system has an optical element configured to provide circular curvature, along the second axis, to an optical wavefront that travels through the non-spherical portion toward the camera.

Implementations of such a surveillance system may include one or more of the following features. A mount coupled to the optical element and configured to move the optical element to a plurality of positions adjacent to the non-spherical portion. The optical element is affixed to the non-spherical portion. The optical element comprises a cylindrical lens having circular curvature along the second axis. The optical element comprises a diffractive optical element. The optical element comprises an adaptive optics element. The non-spherical portion is cylindrical or frustoconical.

Items and/or techniques described herein may provide one or more of the following capabilities, as well as other capabilities not mentioned. A simple, cost-effective solution to correct optical aberrations in surveillance domes. The ability to use hemispherical surveillance dome structures and minimize image degradation through a non-spherical base, without having to utilize more expensive spherical structures.

DETAILED DESCRIPTION

Techniques are discussed for correcting (e.g., at least partially compensating for) optical aberrations that exist in surveillance domes that have spherical and non-spherical parts. For example, the image quality of a surveillance camera is reduced when it focuses on an object through a non-spherical base of a surveillance dome. This image quality reduction could potentially compromise the security of the area monitored by the surveillance camera by failing to provide enough detail to identify individuals or other objects of interest. Utilizing a corrective optical element to provide curvature to a wavefront that travels through the non-spherical base, however, helps preserve the image quality of the camera and thereby helps maintain the integrity of the surveillance system.

Figure 1A:
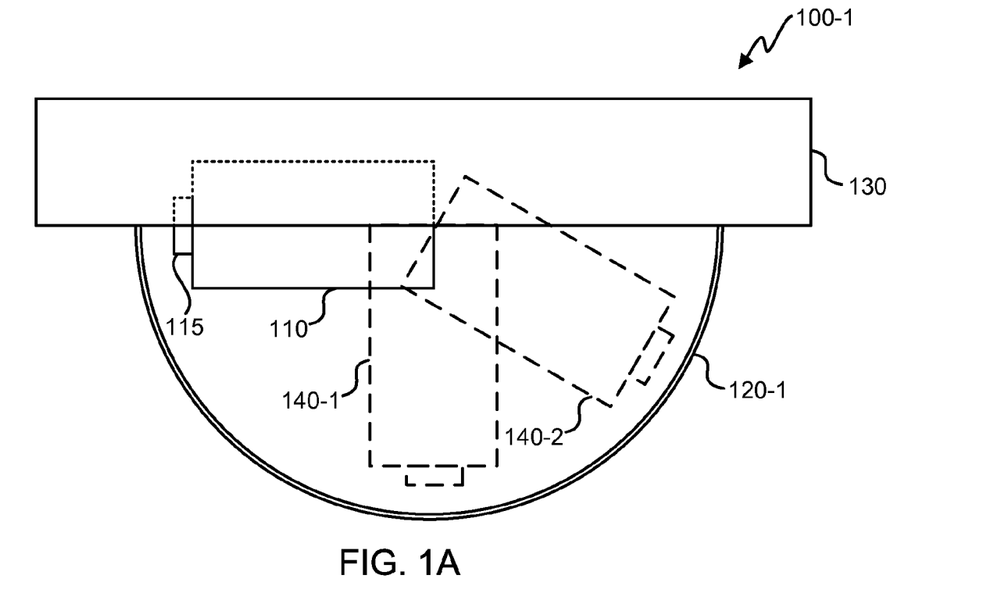
FIG. 1A is a cross-sectional illustration of a surveillance unit with a hemispherical surveillance dome.
Figure 1B:
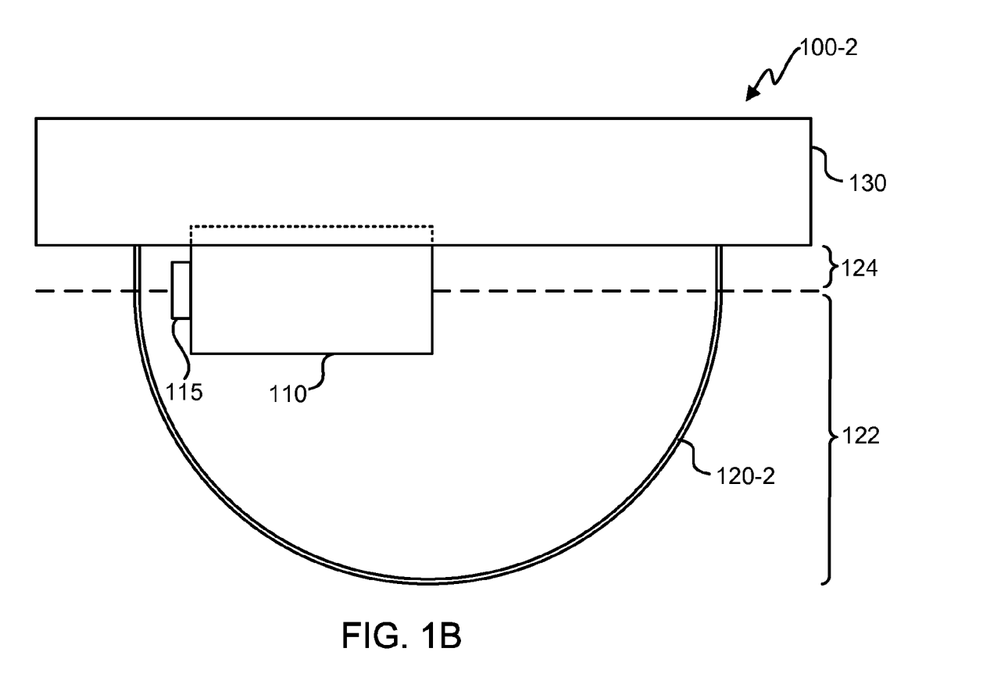
FIG. 1B is a cross-sectional illustration of a surveillance unit with a surveillance dome with a spherical part coupled with a non-spherical base.

FIGS. 1A and 1B are cross-sectional views of a surveillance unit 100 that help illustrate relevant optical issues. Referring to FIG. 1A, a first surveillance unit configuration 100-1 includes three basic components: a camera 110, a surveillance dome 120-1, and a housing 130 with which the camera 110 and the surveillance dome 120-1 are coupled.

The camera 110 can comprise any of a variety of cameras, including fixed and adjustable cameras. For example, a pan, tilt, and zoom (PTZ) camera, such as the Spectra® HD, by Pelco® of Clovis, Calif., can be used. In this configuration, the surveillance dome 120-1 is a hemisphere of non-opaque material, such as glass or plastic. The surveillance dome 120-1 can be tinted and/or coated so that the orientation of the camera 110 is obscured from a viewpoint outside the surveillance dome 120-1.

The position of the surveillance dome 120-1 in relation to the camera 110 has an effect on the optical performance of the camera 110. For preferable optical conditions, the optical axis of the camera 110 is coincident with the center of curvature the surveillance dome 120-1 to help reduce image degradation from the presence of the surveillance dome 120-1. When the camera 110 is adjusted to different positions (such as positions 140-1, 140-2), the optical axis remains at center of curvature of the surveillance dome 120-1 to preserve the optical integrity of the image. Other configurations detailed herein can include a similarly-adjustable camera 110, although multiple camera positions may not be explicitly indicated in the corresponding figures.

The geometric relationship between the optical axis of the camera 110 and the surveillance dome 120-1 presents issues when the camera 110 is positioned horizontally.

Specifically, with the camera 110 positioned horizontally, the housing 130 blocks half of the camera lens aperture 115. Therefore, when the camera 110 is focused on an object on or near the camera's horizon, a corresponding image taken from the camera 110 is degraded, and much of the image can lack any useful information.

In order to reduce this blockage of the camera lens aperture 115, the camera's optical axis can be slightly pushed down into a surveillance dome 120. However, the resulting aberrations due to a de-centering of the optical axis from the center of curvature of the surveillance dome 120 is enough to cause substantial image quality degradation. A preferable solution therefore preserves the camera's optical axis at or near the center of curvature of the surveillance dome 120 while also distancing the camera 110 from the housing 130.

FIG. 1B, shows a second surveillance unit configuration 100-2 that includes a surveillance dome 120-2 that is shifted down with the camera's optical axis. The resulting shape of the surveillance dome 120-2 includes a spherical portion 122 and a non-spherical portion 124. The spherical portion 122 is typically hemispherical, but can form any portion of a sphere. The non-spherical portion 124 connects the spherical portion 122 of the surveillance dome 120-2 to the housing 130. The non-spherical portion 124 is cylindrical in FIG. 1B, although other shapes, such as frustoconical, could be used.

In this configuration 100-2, when the camera 110 is disposed in a horizontal position, the lower half of the camera lens aperture 115 sees the spherical portion 122 of the surveillance dome 120-2, and the upper section of the camera lens aperture 115 sees the non-spherical portion 124. The non-spherical portion 124 is generally curved along a horizontal axis and flat along a vertical axis. As a result, the optical wavefront aberration caused by the non-spherical portion 124 of the dome is the same or similar to the optical wavefront aberration caused by the spherical portion 122, but only along the horizontal axis. Because the non-spherical portion 124 is generally flat along the vertical axis, it causes little or no aberration along the vertical axis. For instance, it imparts a cylindrical shape to the wavefront in this upper half of the camera lens aperture 115.

Figure 2:
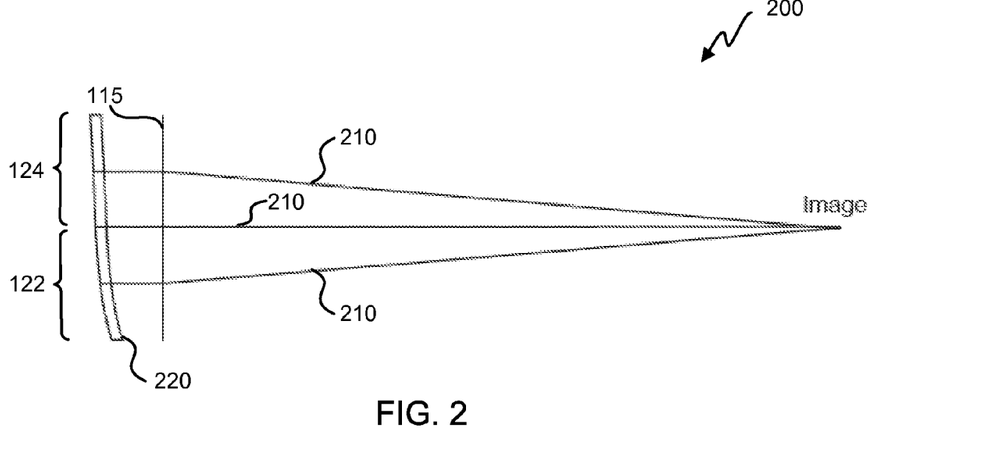
FIG. 2 is a ray-tracing diagram of the optical components of the surveillance unit of FIG. 1B.

FIG. 2 is a simplified cross-sectional diagram 200 of rays 210 passing through optical components of a portion of a surveillance unit 100. In this diagram, only a section of the surveillance dome 220 is shown. Light rays 210 pass through a non-spherical portion 124 and a spherical portion 122 and camera lens aperture 115 to form an image on an image capturing unit (not shown) of the camera 110. In this diagram 200, the non-spherical portion 124 is frustoconical, slanting outward along a vertical axis as the distance from the spherical portion 122 increases. The optical configuration in this diagram 200 forms the basis for computer simulation results shown in FIGS. 3-4.

Figure 3:
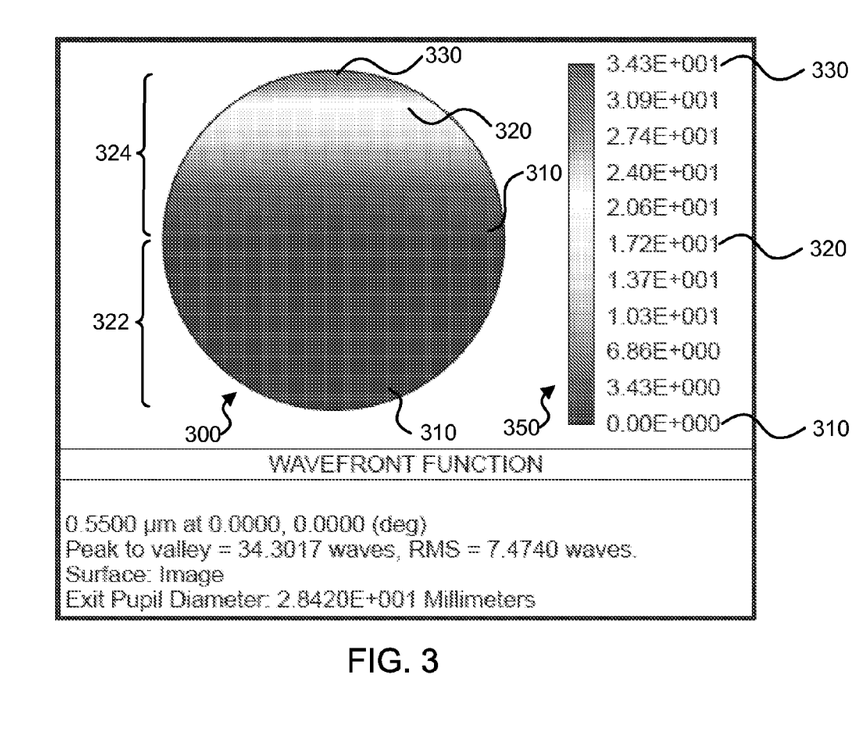
FIG. 3 is a representation of computer simulation results showing wavefront error of the optical configuration in FIG. 2.

FIG. 3 is a simplified drawing of computer simulation results showing a wavefront of light having a wavelength of 550 nanometers (nm) travelling through the optical configuration of the diagram 200 in FIG. 2. The simulation of FIG. 3 shows a graph 300 with an upper portion 324 and a lower portion 322, corresponding to a wavefront travelling through the non-spherical (frustoconical) portion 124 and spherical portion 122 of the surveillance dome section 220, respectively.

The wavefront error is indicated in the graph 300 by a gradient with values shown in scale 350. For simplicity, the values are split into 3 groups: low wavefront error 310, moderate wavefront error 320, and high wavefront error 330. As shown by the upper portion of the graph 324, the wavefront error of the portion of the wavefront that travels through the non-spherical portion 124 is cylindrical with a wavefront error peaking at roughly 34 waves.

The lower portion of the graph 322 shows the relatively little wavefront error given by the spherical portion 122. The spherical portion 122 imparts a spherical shape to the wavefront that results in slight defocus with some small amount of spherical aberration. This can be corrected effectively by adjusting the focus of the camera 110.

Figure 4:
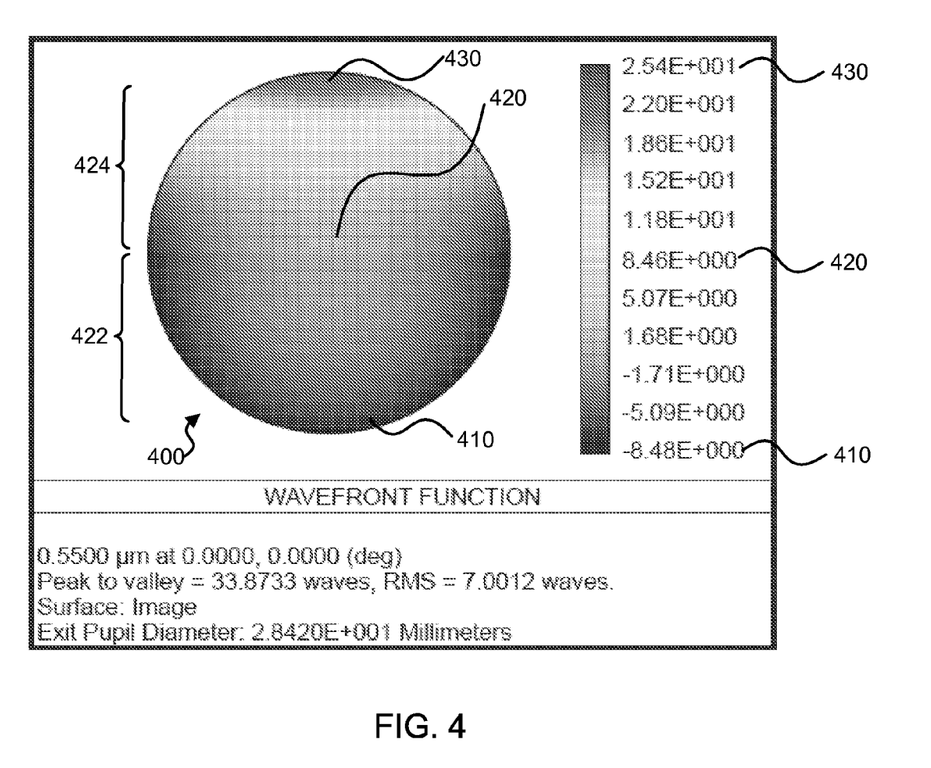
FIG. 4 is another representation of computer simulation results showing wavefront error of the optical configuration in FIG. 2, after a refocus of the camera.

The mismatch of wavefronts of the upper portion of the graph 324 and the lower portion of the graph 322, however, cannot be compensated adequately by adjusting the focus of the camera 110. FIG. 4, which shows simulation results similar to FIG. 3 but with an adjusted focus, illustrates that refocusing the camera 110 does little to reduce the wavefront error (the peak of which remains at nearly 34 waves). As with FIG. 3, the values in graph 400 of FIG. 4 are split into 3 groups: low wavefront error 410, moderate wavefront error 420, and high wavefront error 430.

Figure 5:
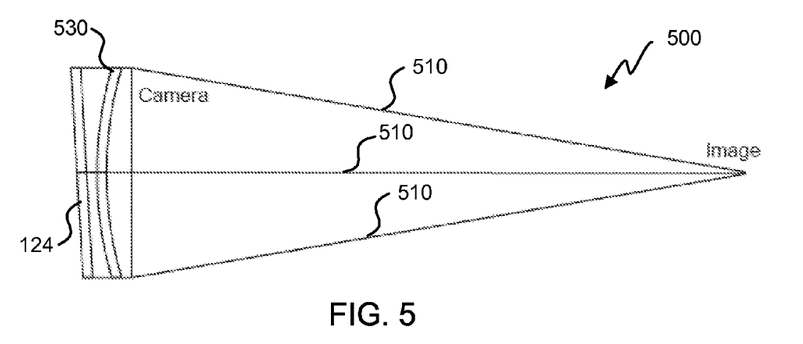
FIG. 5 is a simplified cross-sectional diagram of rays passing through optical components of the surveillance unit similar to FIG. 2, but with a corrective optical element.

FIG. 5 is a cross-sectional view of a configuration 500 similar to FIG. 2, but with a corrective optical element 530. As discussed above, the non-spherical portion 124 provides a wavefront that is curved along the horizontal axis only. The corrective optical element 530, however, can provide curvature to the wavefront along a vertical axis. By placing the corrective optical element 530 the path of the wavefront that travels through the non-spherical portion 124, the resulting wavefront is curved in both horizontal and vertical axes, similar to the wavefront provided by the spherical portion 122 (not shown). The resulting wavefront can therefore be corrected by a slight refocus of the camera 110, allowing light rays 210 to converge into the correct image.

The use of the corrective optical element 530 may be limited, depending on desired functionality. For example, as discussed in further detail below, the corrective optical element 530 may be used on an as-needed basis. For example, optical aberrations may be tolerable up to a certain zooming factor threshold for the camera 110. But when the camera 110 zooms to a zooming factor above the zooming factor threshold, the corrective optical element 530 may be required to bring the image quality to acceptable standards.

Although placing the corrective optical element 530 adjacent to the non-spherical portion 124 (either on the inside or outside of the surveillance dome 120 (not shown)) may provide a simpler optical solution, an appropriately-modified corrective optical element 530 can be located elsewhere in the optical path of the wavefront. Also, there is a shift in the wavefront travelling through the non-spherical portion 124 compared to its counterpart travelling through the spherical portion 122 (not shown). This shift is known as wavefront piston, which has little effect on the configuration 500 due to the light's relatively short coherence length.

Figure 6:
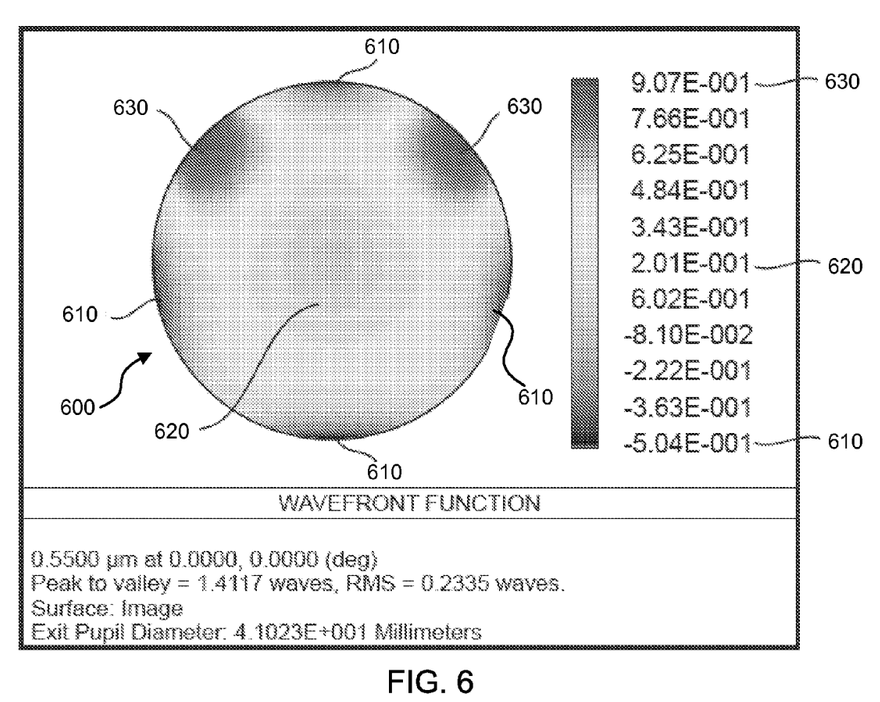
FIG. 6 is a representation of computer simulation results showing wavefront error of the optical configuration in FIG. 5.

FIG. 6 is a simplified drawing of computer simulation results of the configuration 500 of FIG. 5, displayed in a manner similar to the simulations of FIGS. 3 and 4. The graph 600 illustrates the wavefront error of a corrected wavefront, provided by a non-spherical portion 124 and the corrective optical element 530. Again, wavefront error values are split into 3 groups: 610, 620, and 630. In contrast to the wavefront error of around 34 waves of the wavefronts shown in FIGS. 3 and 4, the wavefront error of the corrected wavefront shown in FIG. 6 peaks at only 1.4 waves. This small amount of error enables the camera 110 to provide a much clearer image when the camera 110 is in a horizontal (or near-horizontal) position.

The circular curvature of the corrective optical element 530 can be substantially the same as the circular curvature of the non-spherical portion 124, but rotated by 90°. This can provide simple, low cost optical aberration correction because the same manufacturing process that creates the non-spherical portion 124 can be used to create the corrective optical element 530. Additional or alternative corrective optical elements 530 can include a cylindrical lens, an aberration compensated diffractive optical element (which can correct for higher order aberration), and an adaptive optics element (such as a liquid crystal wavefront corrector).

Optical tolerances and accuracy of systems using a corrective optical element 530, such as the one shown in FIG. 5, can vary based on the physical dimensions of the optical components and the desired functionality of the systems. The optical behavior of a desired system can be simulated using a variety of optical tools, such as ZEMAX® software by ZEMAX® Development Corporation of Bellevue, Wash.

For example, a computer simulation (not shown) for system in which the diameter of the spherical portion 122 of a surveillance dome 120 is 5.97 inches, the thickness of the surveillance dome 120 is 0.075 inches, and the height of the non-spherical portion 124 of the surveillance dome 120 is 0.75 inches, shows a relatively high tolerance for lateral movement and movement along the optical axis. According to the simulation, the corrective optical element 530, a cylindrical lens, could be shifted by nearly 0.5 inches along the optical axis and nearly 0.1 inches laterally (i.e., along the interface between the non-spherical portion 124 and the spherical portion 122) before there is any noticeable degradation of image quality. In the simulation, the corrective optical element 530 is preferably placed within 0.005 inches of the interface between the non-spherical portion 124 and the spherical portion 122. But this preference can be relaxed using other corrective optical elements, such as liquid crystal wavefront corrector or other adaptive optics.

Figure 7A:
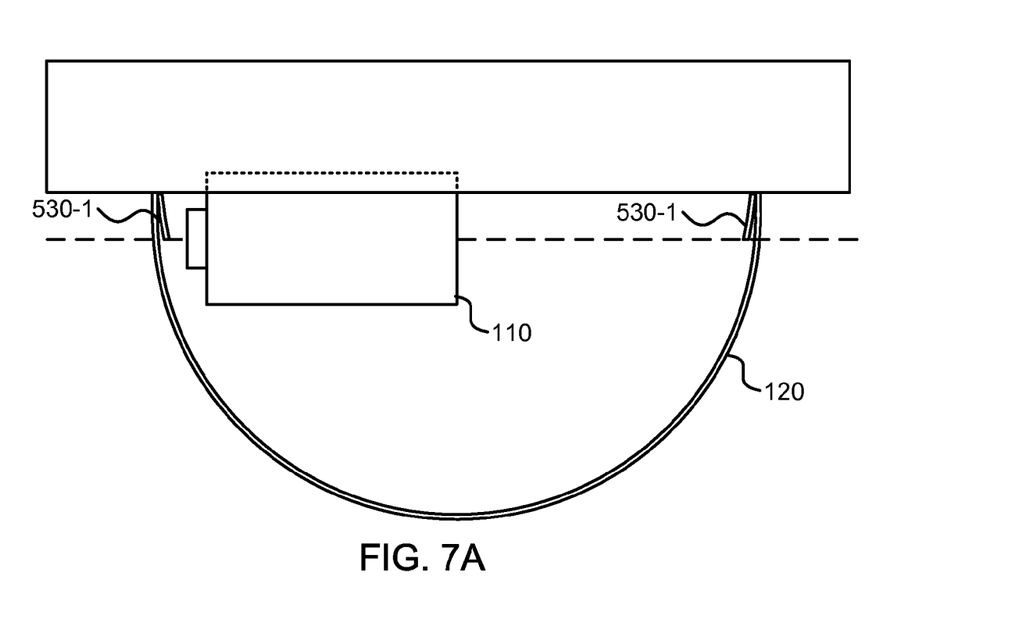
FIG. 7A is a simplified cross-sectional illustration of a surveillance unit configuration utilizing corrective optical element(s).
Figure 7B:
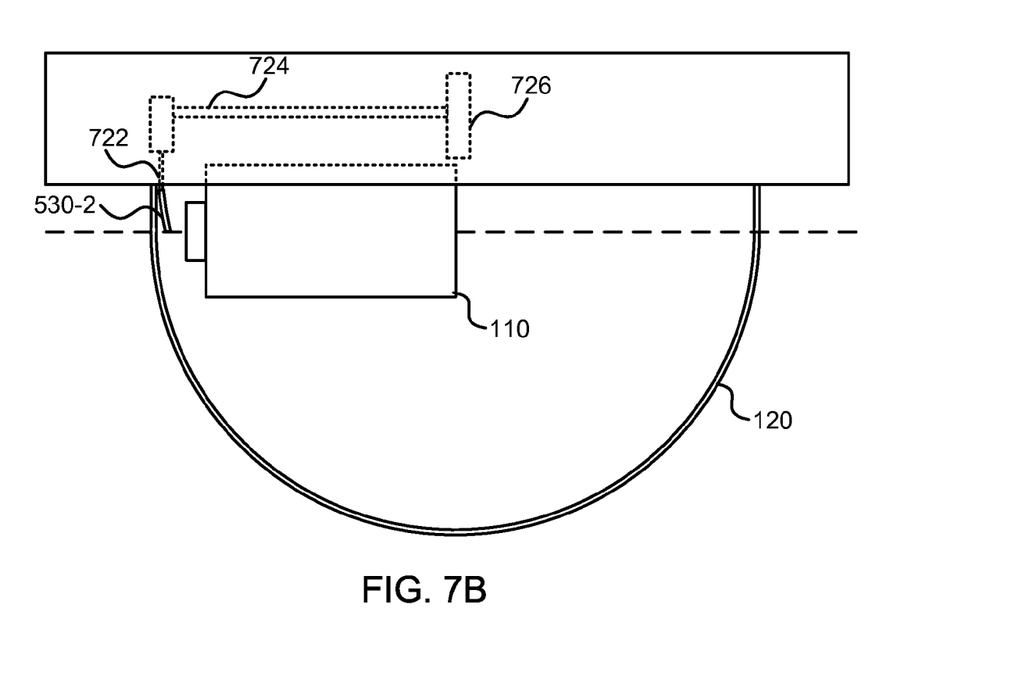
FIG. 7B is a simplified cross-sectional illustration of another surveillance unit configuration utilizing corrective optical element.

FIGS. 7A-7B are simplified cross-sectional illustrations of surveillance unit configurations utilizing corrective optical elements 530. In FIG. 7A, the corrective optical element 530-1 is disposed on the inside of a surveillance dome 120. The corrective optical element 530-1 can be formed of plastic, glass, and/or other optical materials, is temporarily or permanently affixed to the inside of the surveillance dome using a chemical adhesive, physical interlocking, and/or other means. One or more corrective optical elements 530 may be affixed to the surveillance dome in certain locations corresponding to locations in which the camera may need too assume a horizontal or near-horizontal position. For example, corrective optical elements 530 can be placed in locations on opposite sides of a surveillance dome placed in a hallway to provide optical correction when the camera is oriented to face down the hallway, but no correction may be needed when the camera is oriented to face a nearby wall.

Referring to FIG. 7B, a corrective optical element 530-2 may be attached to a mechanical apparatus 724 configured to move the corrective optical element 530-2 into the aperture of the camera 110 when needed. When the camera 110 is in a horizontal position, for example, and has zoomed to a point at or above a threshold at which optical aberrations are unacceptably degrading image quality, the mechanical apparatus 724 moves the corrective optical element 530-2 into the aperture of the camera 110. The mechanical apparatus 724 includes a pivot 726 around which the mechanical apparatus 724 is configured to rotate. A mount 722 holding the corrective optical element 530-2 is configured to move the corrective optical element 530-2 into and out of the aperture of the camera 110 as needed, by, for example, extending, retracting, and/or rotating the corrective optical element 530-2.

Figure 8:
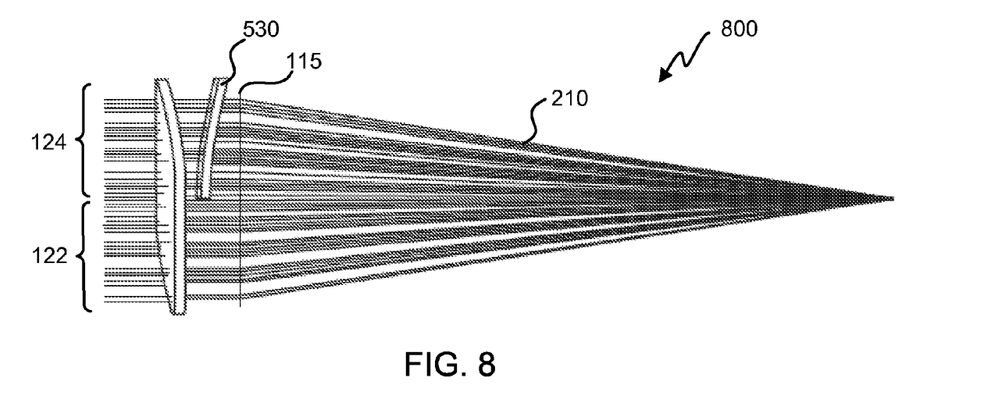
FIG. 8 is a simplified is a ray-tracing diagram of the optical components of a surveillance unit using a corrective optical element.

FIG. 8 is a simplified cross-sectional diagram 800 of rays 210 passing through optical components of a portion of a surveillance unit 100 with a corrective optical element corrective optical element 530, similar to the cross section shown in FIG. 2. In this diagram 800, light rays 210 pass through a non-spherical portion 124 and a spherical portion 122 and camera lens aperture 115 to form an image on an image capturing unit (not shown) of the camera 110. The optical configuration in this diagram 800 forms the basis for computer simulation results shown in FIGS. 9-10.

Figure 9:
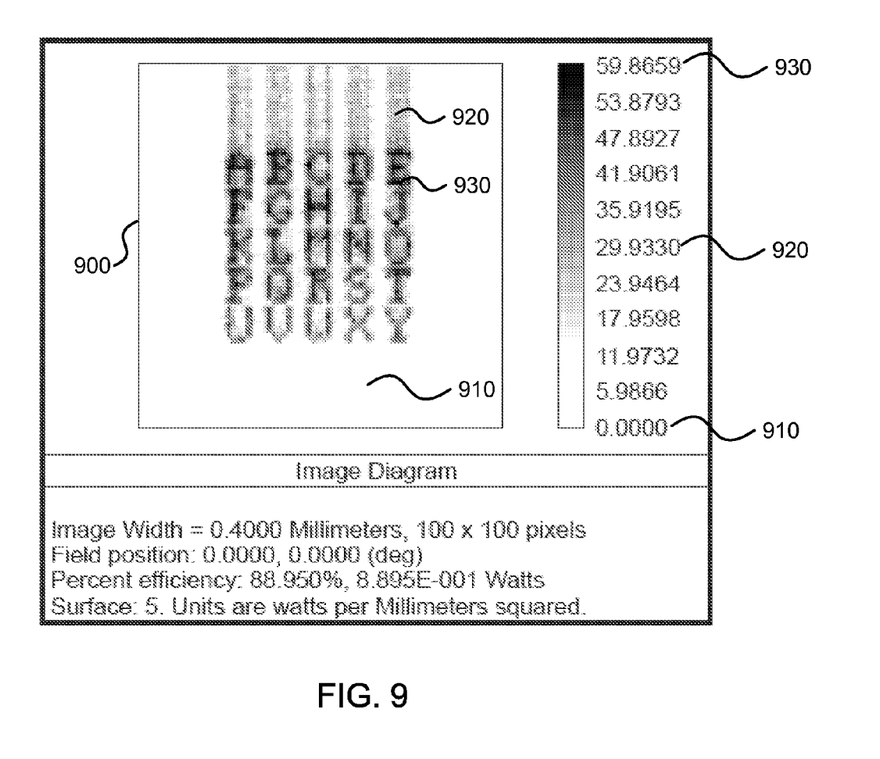
FIG. 9 is a simplified drawing of a computer-simulated image taken by the surveillance unit of FIG. 8 without the corrective optical element.
Figure 10:
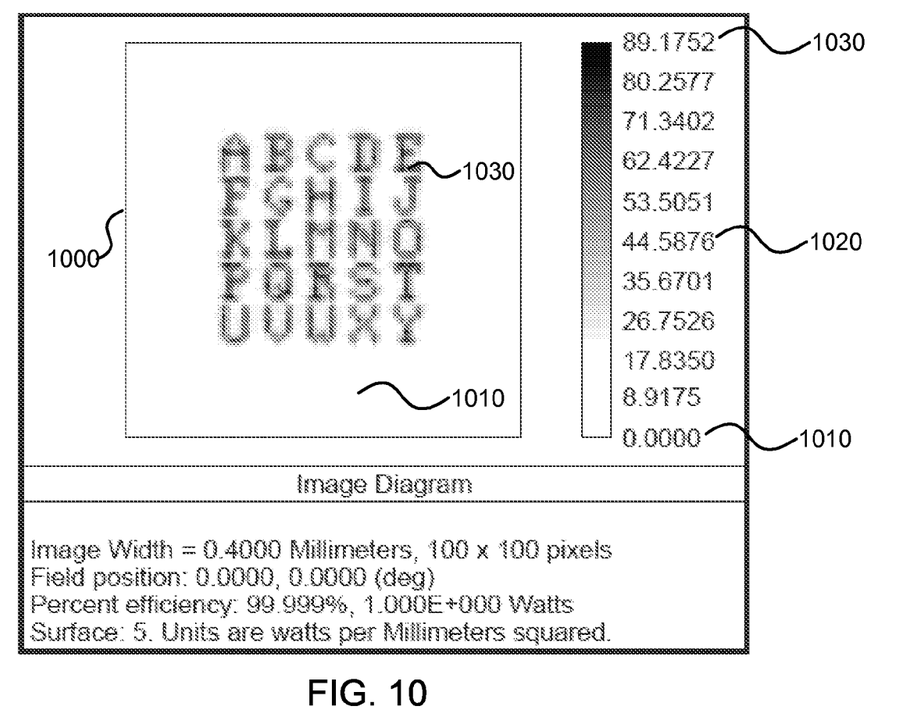
FIG. 10 is a simplified drawing of a computer-simulated image taken by the surveillance unit of FIG. 8 using the corrective optical element.

FIGS. 9-10 are simplified drawings of computer-simulated images that show an image of letters seen by a surveillance unit 100 before and after a corrective optical element 530 is used. FIG. 8, for example, shows a simulated image 900 seen by a surveillance unit 100 without the corrective optical element 530. The contrast of the letters in reference to the background is shown as a gradient that can be split into 3 regions: a region of low contrast 910, a region of moderate contrast 920, and a region of high contrast 930. The simulated image 900 shows smearing in the vertical direction because of an astigmatism due to the insufficient curvature of the wavefront in a vertical direction.

FIG. 10, on the other hand, shows a simulated image 1000 as seen by the surveillance unit 100 of FIG. 9 using the corrective optical element 530. In this simulation, the correcting corrective optical element 530 has the same composition and curvature as the non-spherical portion 124 of the surveillance dome 120, but is rotated by 90° relative to the non-spherical portion 124. The simulated image 1000 has visible improvement in quality by using the corrective optical element 530—there is no vertical smearing. Additionally, the simulated image 1000 has higher efficiency and contrast than the simulated image 900 of FIG. 9, showing how a system utilizing a corrective optical element 530 can have better light sensitivity.

The terms "horizontal" and "vertical" as used herein are not limiting. Rather, these terms are used to provide clarity in the descriptions of the figures. Configurations with orientations different from those explicitly shown are contemplated, including configurations with axes other than "horizontal" and "vertical."

The methods, systems, and devices discussed above are examples and not limiting. Various configurations may omit, substitute, or add various procedures or components as appropriate. For instance, features described with respect to certain configurations may be combined in various other configurations. Different aspects and elements described above as being separate or in different configurations may be combined. Moreover, although configurations described herein are in the context of video surveillance systems, the methods, systems, and devices discussed above applications apply in other contexts where a camera system tracks (or can track) an object of interest, such as sporting events, video conferences, and motion capture systems, among others.

Specific details are given in the description to provide a thorough understanding of example configurations and implementations. Other examples may or may not use these specific details. For example, well-known circuits, processes, algorithms, structures, and techniques have been shown without unnecessary detail in order to avoid obscuring the description.

Various modifications, alternative constructions, and equivalents may be used without departing from the spirit of the disclosure. For example, elements described above may be components of a larger system, where other rules may take precedence over or otherwise modify the description. Also, a number of steps may be undertaken before, during, or after the above elements are considered. Accordingly, the above description is not limiting of the disclosure and does not define the bounds of the claims.

Other examples and implementations are within the scope and spirit of the disclosure and appended claims. Features implementing functions may be physically located at various positions, including being distributed such that portions of functions are implemented at different physical locations.

Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Further, more than one invention may be disclosed.

What is claimed is:

1. An optical system for correcting optical aberrations, the optical system comprising:
    a dome, through which an optical wavefront can pass, comprising a spherical portion and a non-spherical portion, wherein the non-spherical portion is coupled to the spherical portion and the non-spherical portion has circular curvature along a first axis;
    a lens configured to provide circular curvature to an optical wavefront incident upon the non-spherical portion normal to the first axis, and
    a mount coupled to the lens and configured to move the lens parallel to the first axis between a first and second position, in the first position the lens intersecting a radial path from the first axis to the non-spherical portion to alter wavefronts of light passing through the non-spherical portion of the dome toward the first axis, and in the second position being outside of the radial path;
    wherein wavefronts of light having passed through the spherical portion of the dome will be spherically shaped and wavefronts of light having passed through the non-spherical portion of the dome and the lens along the radial path will be spherically shaped.

2. The optical system recited in claim 1, wherein the lens is configured to provide circular curvature to the optical wavefront along a second axis orthogonal to the first axis.

3. The optical system recited in claim 2, wherein the lens comprises a cylindrical lens having curvature along the second axis.

4. The optical system recited in claim 3, wherein the curvature of the cylindrical lens along the second axis is substantially the circular curvature of the non-pherical portion along the first axis.

5. The optical system recited in claim 1, wherein the lens comprises a diffractive lens.

6. The optical system recited in claim 1, wherein the lens comprises an adaptive lens.

7. The optical system recited in claim 1, wherein the non-spherical portion is cylindrical or frustoconical.

8. A surveillance system comprising:
    a dome, through which an optical wavefront can pass, comprising a spherical portion and a non-spherical portion, wherein the non-spherical portion is coupled to the spherical portion, the non-spherical portion having circular curvature along a first axis;
    a camera, disposed within the dome, rotationally mounted to provide rotational movement around a point coincident with a center of curvature of the spherical portion;
    a lens configured to provide circular curvature to an optical wavefront incident upon the non-spherical portion normal to the first axis; and
    a mount coupled to the lens and configured to move the lens parallel to the first axis between a first and second position, in the first position the lens intersecting a radial path from the first axis to the non-spherical portion to alter wavefronts of light passing through the non-spherical portion of the dome toward the first axis, and in the second position being outside of the radial path;
    wherein wavefronts of light having passed through the spherical portion of the dome will be spherically shaped and wavefronts of light having passed through the non-spherical portion of the dome and the lens along the radial path will be spherically shaped.

9. The surveillance system recited in claim 8, wherein the non-spherical portion is configured to provide circular curvature to the optical wavefront along a second axis orthogonal to the first axis.

10. The surveillance system recited in claim 8, wherein the lens comprises a cylindrical lens having curvature along a second axis orthogonal to the first axis.

11. The surveillance system recited in claim 10, wherein the curvature of the cylindrical lens along the second axis is substantially the circular curvature of the non-spherical portion along the first axis.

12. The surveillance system recited in claim 8, wherein the lens comprises a diffractive lens.

13. The surveillance system recited in claim 8, wherein the lens comprises an adaptive lens.

14. The surveillance system recited in claim 8, wherein the non-spherical portion is cylindrical or frustoconical.

15. A surveillance system comprising:
a dome, through which an optical wavefront can pass, comprising a non-opaque material and including: a hemispherical portion having circular curvature along a first axis and a second axis, wherein the second axis is orthogonal to the first axis; and
a non-spherical portion coupled to the hemispherical portion, the non-spherical portion having circular curvature along the first axis;
a camera, disposed within the dome, rotationally mounted to provide rotational movement around a point coincident with a center of curvature of the hemispherical portion;
a lens configured to provide circular curvature to an optical wavefront, incident upon the non-spherical portion, normal to the first axis; and
a mount coupled to the lens and configured to move the lens parallel to the first axis between a first and second position, in the first position the lens intersecting a radial path from the first axis to the non-spherical portion to alter wavefronts of light passing through the non-spherical portion of the dome toward the first axis, and in the second position being outside of the radial path;
wherein wavefronts of light having passed through the spherical portion of the dome will be spherically shaped and wavefronts of light having passed through the non-spherical portion of the dome and the lens along the radial path will be spherically shaped.

16. The surveillance system recited in claim 15, wherein the lens comprises a cylindrical lens having circular curvature along the second axis.

17. The surveillance system recited in claim 15, wherein the lens comprises a diffractive lens.

18. The surveillance system recited in claim 15, wherein the lens comprises an adaptive lens.

19. The surveillance system recited in claim 15, wherein the non-spherical portion is cylindrical or frustoconical.

20. The surveillance system recited in claim 15 wherein the mount is configured to move the lens from the second position to the first position in response to the camera zooming such that optical aberrations unacceptably degrade image quality of the camera.

* * * * *